United States Patent Office 3,736,123
Patented May 29, 1973

3,736,123
HERBICIDAL CONTROL OF CRABGRASS
Angelo John Speziale, Creve Coeur, and Lowell R. Smith, Chesterfield, Mo., assignors to Monsanto Company, St. Louis, Mo.
No Drawing. Application Apr. 12, 1968, Ser. No. 721,062, now Patent No. 3,642,863, which is a continuation-in-part of application Ser. No. 454,209, May 7, 1965, now Patent No. 3,450,747, which in turn is a continuation-in-part of application Ser. No. 221,302, Sept. 4, 1962. Divided and this application Nov. 11, 1971, Ser. No. 197,954

Int. Cl. A01n 9/20
U.S. Cl. 71—111      4 Claims

ABSTRACT OF THE DISCLOSURE

The growth of crabgrass is inhibited by applying to the soil compounds of the class of alkyl esters of N-(2-nitrobenzoyl) carbamic acid.

---

This application is a division of application Ser. No. 721,062 filed Apr. 12, 1968, now U.S. Pat. No. 3,642,863, which application is a continuation-in-part of copending application Ser. No. 454,209, filed May 7, 1965, now U.S. Pat. No. 3,450,747, which latter application is a continuation-in-part of application Ser. No. 221,302, filed Sept. 4, 1962, and now abandoned.

This invention relates to new and useful compounds of the general formula

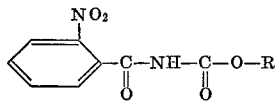

wherein R is alkyl containing from 1 to 5 carbon atoms, inclusive. These compounds are readily prepared by reacting N-(2-nitrobenzoyl) isocyanate in substantially equimolecular proportions in a suitable inert organic liquid in a fluid system, i.e. at a reaction temperature above the freezing point of the system up to and including the boiling point of the system, according to well known procedures with an alkyl alcohol of the formula ROH wherein R is a $C_{1-5}$ alkyl radical (e.g. methyl, ethyl, propyl, butyl, amyl, and the various alkyl isomeric forms thereof).

This isocyanate precursor is prepared by heating under anhydrous conditions to effect evolution of hydrogen chloride a mixture of at least one mole of oxalyl chloride with one mole of 2-nitrobenzamide

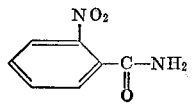

in the presence of an inert organic liquid having a boiling point below that of the isocyanate end product, and thereafter distilling from the resulting reaction mass the said isocyanate. As illustrative of its preparation is the following:

To a suitable reaction vessel equipped with a thermometer, agitator and reflux condenser is charged at room temperature 16.6 parts by weight of 2-nitrobenzamide, 13.0 parts by weight of oxalyl chloride and 200 parts by weight of 1,2-dichloroethane. The so charged mass is heated to reflux while agitating and then refluxed for 16 hours. Thereafter the resulting mass is subjected to vacuum distillation and the cut taken at 120–122° C. at 0.5 mm. of mercury is 2-nitrobenzoyl isocyanate.

As aforementioned these isocyanates react with alkyl alcohols of the formula ROH wherein R has the aforedescribed significance in accordance with well known procedures to provide the compounds of this invention. As illustrative of such compounds is the following methyl N-(2-nitrobenzoyl)carbamate (M.P. 119.5–120.2° C.),
ethyl N-(2-nitrobenzoyl)carbamate (M.P. 126–128° C.),
isopropyl N-(2-nitrobenzoyl)carbamate (M.P. 123.5–126.5° C.), etc.

The alkyl N-(2-nitrobenzoyl)carbamates of this invention are unique in the preemergent control of crab grass as compared to their respective N-(3-nitrobenzoyl) and N-(4-nitrobenzoyl) position isomer esters. As illustrative of such position isomer esters are ethyl N-(3-nitrobenzoyl)carbamate (M.P. 95–98° C.),
isopropyl N-(3-nitrobenzoyl)carbamate (M.P. 124–127° C.),
ethyl N-(4-nitrobenzoyl)carbamate (M.P. 142–144° C.), and
isopropyl N-(4-nitrozenzoyl)carbamate (M.P. 158–161° C.).

These position isomer esters are made in exactly the same manner as the esters of this invention, that is from the appropriate alkyl alcohol and the appropriate aroyl isocyanate, that is 3-nitrobenzoyl isocyanate which boils at 120–125° C. at 0.7 mm. of mercury and 4-nitrobenzoyl isocyanate which boils at 122° C. at 1.5 mm. of mercury. These respective isocyanate precursors are prepared in exactly the same manner as the isocyanate precursor of the esters of this invention, that is from oxalyl chloride and the appropriate amide, namely 3-nitrobenzamide or 4-nitrobenzamide.

The compounds of this invention are uniquely useful for inhibiting the growth of crab grass, Digitaria spp., prior to its emergence from soil and to illustrate their activity is the following: a measured amount of crab grass seeds, Digitaria sanguinalis, are planted in aluminum pans by scattering them randomly over the surface of a good grade of top soil treated with 0.05% of a resinous polyelectrolyte soil conditioner which was compacted to a depth of ⅜″ from the top of the pan. The seeds are then covered with ⅜″ of the prepared soil mixture and the pan levelled. The levelled surface of the soil in the pan is then sprayed with an aliquot of acetone containing an N-(aroyl) carbamate ester below itemized dissolved therein at a rate of 5 pounds of said ester per acre.

The pan is placed in a sand bench and ½″ of water added to the bench. The soil absorbs moisture through perforations in the bottom until the soil surface is about one-half moist, by which time the excess water is the sand bench is drained off. The remaining soil surface is moistened by capillary action.

Fourteen days after application of the N-(aroyl) carbamate ester the results are observed and recorded. The number of crab grass plants which emerged from the soil are counted and converted to a herbicidal rating by means of a fixed scale based on average percent emergence.

(Emergence rates are established for all new seed lots and periodic checks run on old seed in current use.) The scale used is as follows:

| Seed lot, percent emergence (control) | Conversion scale | | | |
|---|---|---|---|---|
| | 3 | 2 | 1 | 0 |
| | Number of plants emerging | | | |
| 100 | 0-5 | 6-10 | 11-15 | 16-20 |
| 90 | 0-5 | 6-9 | 10-13 | 14-20 |
| 80 | 0-4 | 5-8 | 9-12 | 13-20 |
| 70 | 0-4 | 5-7 | 8-11 | 12-20 |
| 60 | 0-3 | 4-6 | 7-9 | 10-20 |
| 50 | 0-3 | 4-5 | 6-8 | 9-20 |
| 40 | 0-2 | 3-4 | 5-6 | 7-20 |

NOTE.—The relative emergence value of th e N-(aroyl) carbamate with respect to its herbicidal effect on each plant is indicated by a number as follows: 0=No inhibition; 1=Slight inhibition; 2=Moderate inhibition; 3=Severe inhibition.

N—(aroyl) carbamate ester

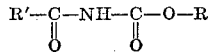

| R' | R | Extent of inhibition |
|---|---|---|
| 2-nitrophenyl | $CH_3$ | 3 |
| Do | $C_2H_5$ | 3 |
| Do | iso-$C_3H_7$ | 3 |
| 3-nitrophenyl | $C_2H_5$ | 0 |
| Do | iso-$C_3H_7$ | 0 |
| 4-nitrophenyl | $C_2H_5$ | 0 |
| Do | iso-$C_3H_7$ | 0 |
| $ClCH_2$ [1] | $CH_3$ | 0 |
| 2-chlorophenyl [2] | $C_2H_5$ | 1 |
| 2-nitrophenyl [3] | Allyl | 1 |
| N-(α-chloroacetyl)-N',N'-dimethylurea [4] | | 0 |

[1] Methyl N-(α-chloroacetyl) carbamate, M.P. 140-142° C.
[2] Ethyl N-(2-chlorobenzoyl) carbamate, M.P. 73.5-75.5° C., prepared from equimolecular proportions of ethyl alcohol and N-(2-chlorobenzoyl) isocyanate, which isocyanate precursor boils at 80-85° C. at 0.4 mm. of mercury and is obtained in exactly the same procedural manner as the isocyanate precursor of the esters of this invention from oxalyl chloride and 2-chlorobenzamide.
[3] Allyl N-(2-nitrobenzoyl) carbamate, M.P. 76-78° C., prepared from equimolecular proportions of allyl alcohol and N-(2-nitrobenzoyl) isocyanate.
[4] M.P. 83-85° C.

From the foregoing evaluation data it is apparent that the alkyl N-(2-nitrobenzoyl) carbamates of this invention are uniquely effective preemergent herbicides for crab grass, Digitaria spp. Valuable preemergent crab grass effects will be observed by applications of small amounts, for example, as low as 0.1 lb. of active component per acre as well as high concentrations, for example, 100 lbs. per acre. The preferred range of application is from about 1 to about 15 lbs. per acre.

Although the compounds of this invention are useful per se in controlling the preemergent growth of crab grass, Digitaria spp., it is preferable that they be supplied to the crab grass growing medium in a dispersed form in a suitable extending agent. It is to be understood that the term "dispersed" is used in its widest possible sense. When it is said that the compounds of this invention are dispersed, it means that the particles of the alkyl N-(2-nitrobenzoyl) carbamates of this invention may be molecular in size and held in true solution in a suitable organic solvent. It means further that the particles may be colloidal in size and distributed throughout a liquid phase in the form of suspensions or emulsions or in the form of particles held in suspension by wetting agents. The term "dispersed" also means that the particles may be mixed with and distributed throughout a solid carrier providing a mixture in particulate form, e.g. pellets, granules, powders, and dusts. The compounds of this invention can be employed in combination with other pesticides, including, for example, nematocides, bactericides, fungicides and insecticides. In this manner it is possible to obtain mixtures which are effective against a wide variety of pests and other forms of noxious life.

When operating in accordance with the present invention growth inhibiting amounts of the compound or a composition containing same are dispersed or distributed in any convenient fashion in soil or other growth media, for example by simply mixing with the soil or by applying to the surface of the soil and thereafter dragging or disking the soil to the desired depth, or by injection or drilling techniques whereby the alkyl N-(2-nitrobenzoyl) carbamates of this invention are deposited beneath the surface of the soil, or by employment of a liquid carrier (solvent or non-solvent) to accomplish the penetration and impregnation. The application of the spray and dust compositions to the surface of the soil may be accomplished by conventional methods, e.g. with power dusters, boom or hand sprayers or spray dusters.

While this invention has been described with respect to certain embodiments, it is to be understood that it is not so limited and that variations and modifications thereof obvious to those skilled in the art can be made without departing from the spirit and scope thereof.

What is claimed is:
1. A method of inhibiting the growth of crabgrass, Digitaria spp., prior to its emergence from soil which comprises treating said soil with an effective growth inhibiting amount of a compound of the formula

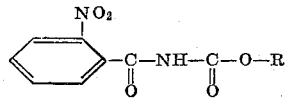

wherein R is alkyl containing from 1 to 5 carbon atoms, inclusive.

2. A method of inhibiting the growth of crabgrass, Digitaria spp., prior to its emergence from soil which comprises treating said soil with an effective growth inhibiting amount of methyl N-(2-nitrobenzoyl) carbamate.

3. A method of inhibiting the growth of crabgrass, Digitaria spp., prior to its emergence from soil which comprises treating said soil with an effective growth inhibiting amount of isopropyl N-(2-nitrobenzoyl) carbamate.

4. A method of inhibiting the growth of crabgrass, Digitaria spp., prior to its emergence from soil which comprises treating said soil with an effective growth inhibiting amount of ethyl N-(2-nitrobenzoyl) carbamate.

References Cited
UNITED STATES PATENTS 3,129,246   4/1964   Harris et al.   260—471 C LEWIS GOTTS, Primary Examiner C. L. MILLS, Assistant Examiner